(12) United States Patent
Choi et al.

(10) Patent No.: US 10,247,255 B2
(45) Date of Patent: Apr. 2, 2019

(54) HUB UNIT HAVING A BRAKE DISC

(71) Applicants: HYUNDAI MOTOR COMPANY, Seoul (KR); KIA MOTORS CORPORATION, Seoul (KR)

(72) Inventors: Jungnam Choi, Seongnam-si (KR); Sung Dae Lim, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/637,461

(22) Filed: Jun. 29, 2017

(65) Prior Publication Data

US 2018/0172081 A1    Jun. 21, 2018

(30) Foreign Application Priority Data

Dec. 15, 2016  (KR) .................. 10-2016-0171860

(51) Int. Cl.

| | |
|---|---|
| *F16D 55/36* | (2006.01) |
| *F16D 13/64* | (2006.01) |
| *F16D 55/2265* | (2006.01) |
| *F16D 1/092* | (2006.01) |
| *F16D 1/08* | (2006.01) |
| *F16D 65/12* | (2006.01) |
| *B60T 1/06* | (2006.01) |
| *B62L 3/02* | (2006.01) |

(52) U.S. Cl.
CPC .......... *F16D 13/646* (2013.01); *B60T 1/062* (2013.01); *F16D 1/087* (2013.01); *F16D 1/092* (2013.01); *F16D 55/22655* (2013.01); *F16D 65/123* (2013.01); *B62L 3/026* (2013.01)

(58) Field of Classification Search
CPC .... B62L 5/08; B62L 5/14; B62L 3/023; F16D 55/50
USPC .............................. 188/17, 18, 26, 71.5, 71.6
See application file for complete search history.

(56) References Cited

U.S. PATENT DOCUMENTS

| | | | | |
|---|---|---|---|---|
| 1,990,510 A | * | 2/1935 | Winkler | .................... B62L 5/14 188/251 M |
| 2,054,583 A | * | 9/1936 | Delaval-Crow | .......... B62L 5/14 188/26 |
| 2,108,501 A | * | 2/1938 | Mueller | .................. B62L 3/023 188/152 |
| 2,318,880 A | * | 5/1943 | Mueller | .................. B62L 3/023 188/18 R |
| 2,572,182 A | * | 10/1951 | Mueller | .................... B62L 5/08 12/146 D |

(Continued)

FOREIGN PATENT DOCUMENTS

| | | |
|---|---|---|
| KR | 1020120097576 A | 9/2012 |
| KR | 1020120097577 A | 9/2012 |

*Primary Examiner* — Christopher P Schwartz
(74) *Attorney, Agent, or Firm* — Lempia Summerfield Katz LLC

(57) ABSTRACT

A hub unit has a brake disc and a hub body disposed to rotate with a rim on which a tire is mounted. An internal space is formed in the hub body, wherein the brake disc is fixed in the internal space. A fixed shaft is disposed and fixed along a rotation center shaft of the hub body. A brake shoe is coupled to the fixed shaft. A brake pad is disposed to contact the brake disc. A braking force applier supplies a braking force to the hub body wherein the brake pad and the brake disc are in contact with each other.

11 Claims, 3 Drawing Sheets

(56) References Cited

U.S. PATENT DOCUMENTS

2006/0260886 A1\* 11/2006 Erlston .................. F16D 55/50
188/71.5

\* cited by examiner

HUB UNIT HAVING A BRAKE DISC

CROSS-REFERENCE TO RELATED APPLICATION

This application claims priority to and the benefit of Korean Patent Application No. 10-2016-0171860 filed in the Korean Intellectual Property Office on Dec. 15, 2016, the entire contents of which are incorporated herein by reference.

BACKGROUND

(a) Field of the Disclosure

The present disclosure relates to a hub unit having a brake disc in a hub body of a bicycle.

(b) Description of the Related Art

There are rim brake type and brake disc type brakes for bicycles.

The rim brake type is a type that obtains braking force by a pad contacting a rim of a bicycle wheel. Of the rim brake type, there are caliper brakes, cantilever brakes, and V brakes.

The brake disc type is a type that obtains braking force by a pad contacting a rotor that is connected with a hub body of a bicycle wheel. Of the brake disc type, there are mechanical and hydraulic pressure types.

The mechanical type of brake disc is a type that has a caliper, in which a brake pad is installed, that fixes a disc rotor connected with the hub body by pulling a cable. The hydraulic pressure type is a type that where caliper fixes the disc rotor to obtain braking force by using hydraulic pressure, not by using the cable.

The brake disc type brake includes a brake handle connected with a bicycle handle bar, a brake cable, a brake lever connected with the brake handle by the brake cable, a caliper, and a brake disc connected with a hub body shaft of the bicycle. The caliper fixes the brake disc by actuating the brake lever to impart braking motion in the caliper.

Meanwhile, the disc is exposed and is disposed on the outside and to one side of the hub body and may become bent relative to a plane of the brake disc by an external or outside shock or force. Also, the disc edge is typically sharp and can cause injury to a person. Further, a front wheel of the bicycle generates moment in one direction during braking because the disc is offset to one side of the hub body, which can cause instability of steering.

FIG. 1 is a schematic cross-sectional view of a hub unit having a brake disc related to the present disclosure.

Referring to FIG. 1, a hub unit having a brake disc includes a fixed shaft 1100, a sealing member 1105, a bearing 1110, a sprocket install portion 1112, a hub body 1115, a brake disc 1120, a brake pad 1125, and a caliper 1130.

The fixed shaft 1100 is disposed along a rotation center shaft and fixed in a dropout of a bicycle frame by a quick release system. Herein, engagement structures of the fixing shaft 1100, the quick release system and the dropout are well-known technology and therefore a detailed description thereof will be omitted.

The hub body 1115 and the sprocket install portion 1112 are disposed on the same axes with the fixed shaft 1100. The fixed shaft 1100 is disposed to penetrate a center portion of the hub body 1115 and the sprocket install portion 1112. The hub body 1115 is engaged with the sprocket install portion 1112.

A sprocket (not shown) is disposed in the sprocket install portion 1112. The sprocket install portion 1112 receives torque through the sprocket to rotate the hub body 1115.

The hub body 1115 is rotatably disposed on the fixed shaft 1100 through the bearing 1110. The brake disc 1120 is fixed at an end portion of the hub body 1115. The brake disc 1120 has a disc shape formed in a circumferential direction of the hub body 1115.

The caliper 1130 is fixed to a portion of a bicycle frame (not shown). An outer edge portion of the brake disc 1120 is inserted into a groove of the caliper 1130. The brake pad 1125 is disposed at both inside surfaces of the caliper 1130 so as to be able to contact the brake disc 1120.

The brake disc 1120 is exposed and is disposed at an outside or distal end portion of the hub body 1115 and may be bent relative to a plane of the brake disc by an external or outside shock or force. The disc 1120 may have a sharp circumferential edge, which may cause injury to a person. Because the brake disc 1120 is offset to one side of the hub body 1115, a front wheel of the bicycle generates moment in one direction during braking, which can cause instability of steering.

The above information disclosed in this Background section is only to enhance understanding of the background of the disclosure and therefore it may contain information that does not form the prior art that is already known in this country to a person of ordinary skill in the art.

SUMMARY

The present disclosure has been made in an effort to provide a hub unit having a brake disc, which prevents the disc from being bent by an external or outside shock or force. The present disclosure has also been made in an effort to provide a hub unit that prevents injury to a person and that eliminates a moment generated in one direction during braking of a front wheel.

A hub unit having a brake disc according to an embodiment of the present disclosure includes a hub body disposed to rotate with a rim on which a tire is mounted. An internal space is formed in the hub body, wherein a brake disc is fixed in the internal space. A fixed shaft is disposed and fixed along a rotation center shaft of the hub body. A brake shoe is coupled to the fixed shaft and a brake pad is disposed to come in contact with the brake disc. A braking force applier for supplying a braking force to the hub body wherein the brake pad and the brake disc are in contact with each other.

The hub body may be rotatably disposed relative to the fixed shaft through a bearing.

The fixed shaft may be disposed to penetrate a center portion of the brake shoe, and the brake pad may be disposed on the brake shoe.

The brake disc may be fixed to an inner side of the hub body, and may be disposed to face the brake pad with a predetermined gap therebetween. The braking force applier may include a piston member configured to push the brake shoe such that the brake pad contacts the brake disc. An elastic member may supply elastic force in a direction in which the brake pad is separated from the brake disc.

The brake shoe may be formed as a pair of the brake shoes that face each other. The brake pad may be disposed at an axial outward side or external side of the brake shoes respectively. The brake disc may be disposed at an inner side or surface of the hub body to correspond to the brake pad.

The brake pad may include two of the brake pads, one carried on each of the pair of brake shoes.

An elastic member may be disposed in or on the fixed shaft and may supply elastic force to an axial outward side or external side of the brake shoe.

The piston member may be disposed between a pair of the pair of the brake shoes and may push the brake shoes in an axial direction away from each other.

A body expansion portion may be formed as part of the hub body such that an exterior diameter of the hub body is expanded in a radial direction. The brake disc may be fixed to an inner side or surface of the body expansion portion.

The hub unit may be engaged with the brake disc to rotate together with the brake disc.

The hub unit may further include a brake cable for supplying hydraulic pressure to the brake force applier, such as a piston member.

The brake shoe may be formed as a pair of the brake shoes that face each other. The brake pads may be fixed in surfaces of the brake shoes facing each other. The brake disc may be fixed to an interior circumference of the hub body between the brake shoes and with a predetermined gap formed between the brake disc and the brake pads.

The elastic member may be disposed between the pair of brake shoes and may push the brake shoe in an axial direction away from one another.

The piston member may be disposed at exterior sides or axial outward facing sides of the brake shoes respectively, and may push the brake shoes in an axial direction toward each other.

According to the present disclosure to achieve this purpose, a brake disc is disposed in a hub body and located at a center portion of a fixed shaft in a longitudinal or axial direction. Thus, the hub unit prevents the brake disc from being bent by an external force or outside shock. The hub unit also prevents injury to a person and eliminates moment generated in one direction during braking of a front wheel to obtain stability of steering.

DETAILED DESCRIPTION OF THE EMBODIMENTS

Figure 1:
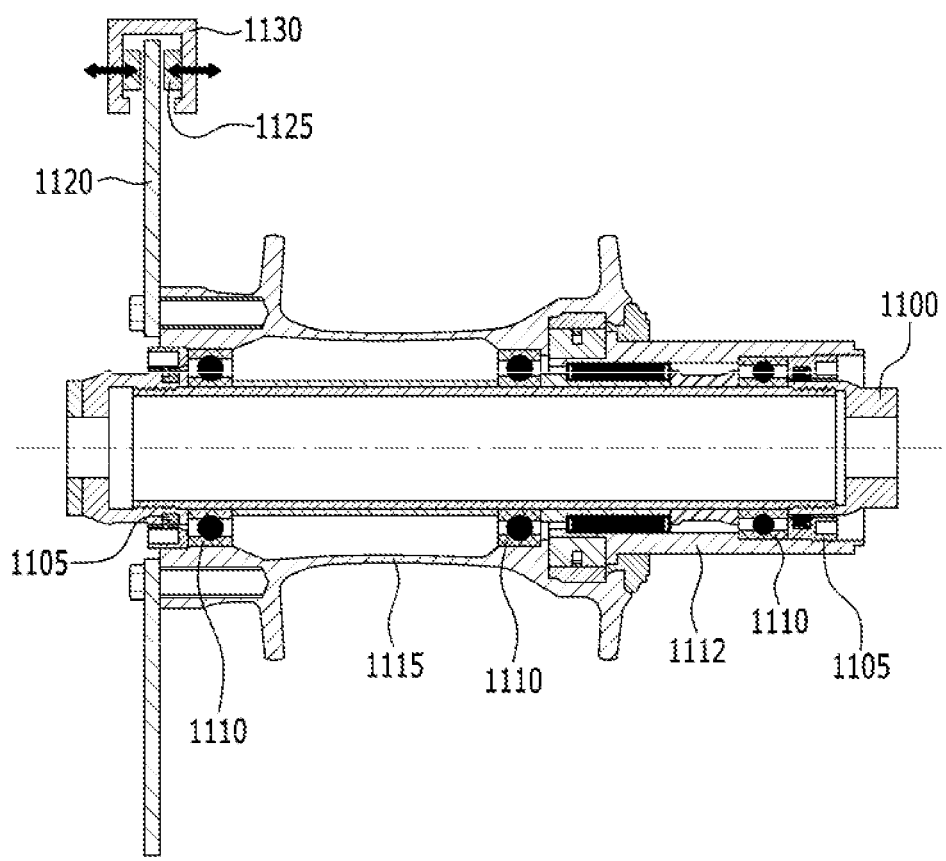
FIG. 1 is a schematic cross-sectional view of a hub unit having a brake disc related to the present disclosure.

Hereinafter, embodiments of the present disclosure are described in detail with reference to the accompanying drawings.

In the drawings, size and thickness of each element is only approximately shown for better understanding and ease of description. Therefore, the present disclosure is not limited to the drawings, and the thicknesses of layers, films, panels, regions, and the like, are exaggerated for clarity.

However, the drawings and description are to be regarded as illustrative in nature and not restrictive. Like reference numerals designate like elements throughout the specification.

The terms "first", "second", "third", and the like in the following description are for distinguishing the components or configurations where the names of such components or configurations are the same. The present disclosure is not limited to the order.

Hereinafter, a hub unit having a brake disc according to an embodiment of the present disclosure is described in detail with reference to accompanying drawings.

Figure 2:
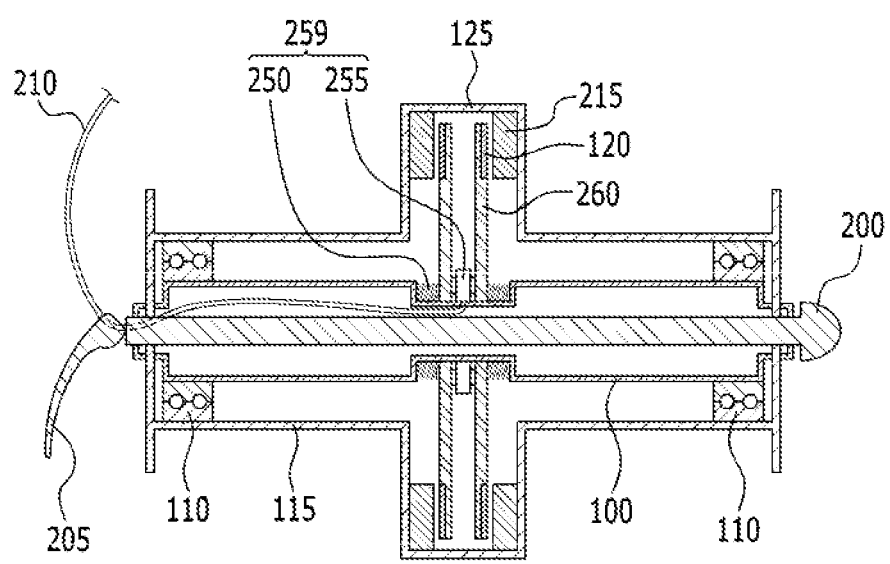
FIG. 2 is a schematic cross-sectional view of a hub unit having a brake disc according to an embodiment of the present disclosure.

FIG. 2 is a schematic cross-sectional view of a hub unit having a brake disc according to an embodiment of the present disclosure.

Referring to FIG. 2, the hub unit includes a brake cable 210, a quick release (QR) lever 205, a first bearing 110 at one end of the hub unit, a hub body 115, a fixed shaft 100, a second bearing 110 at the other end of the hub unit, a QR element or rod 200 coupled to the QR lever 205, a brake shoe 260, a brake pad 120, a brake disc 215, a body expansion portion 125, a piston member 255, and an elastic member 250.

The brake shoe 260 is formed as a pair of the brake shoes, each having a disc shape, and wherein the pair of brake shoes are spaced apart and face each other. The fixed shaft 100 is disposed to penetrate a center portion of the brake shoe 260. The brake shoe 260 is fixed to the fixed shaft 100 in a rotation direction and is also movable along the fixed shaft in an axial direction. In this embodiment, the brake disc 215 is also formed as a pair of the brake discs, each adjacent one of the brake shoes 260.

The piston member 255 is interposed between the pair of the brake shoes 260. The piston member 255 pushes the brake shoes 260 outwardly in an axial direction, away from one another in this embodiment, by using hydraulic pressure transferred through the brake cable 210.

The elastic member 250 is disposed on an external or outward facing side of each of the brake shoes 260 and is based on the outer surface of the fixed shaft 100. The elastic member 250 supplies elastic force in a direction, opposite to the pushing direction of the piston, in which the brake pad 120 is separated from the brake disc or discs 215.

The body expansion portion 125 is a part of the hub body 215 in which an exterior diameter of the hub body is expanded in a radial direction. The body expansion portion 125 is formed in a center portion of the hub body 115 in a length or axial direction thereof. The brake discs 215 are each disposed on or adjacent an inner side or axial inward facing side of the body expansion portion 125 adjacent each brake shoe 260 in this embodiment.

The brake discs 215 face the brake shoes 260 respectively and each of the brake shoes carries a brake pad 120. The brake pads 120 are disposed on the outward facing sides of the respective brake shoes 260 and thus correspond to the brake discs 215 so as to be capable of contacting the brake discs.

The elastic member 250 is disposed in a space formed in a center portion of the fixed shaft 100 in a length or axial direction thereof. An interior circumference of each of the brake shoes 260 is slidably disposed in a groove formed in the fixed shaft 100. The groove may also be the space, in which the elastic member 250 is disposed. The piston member 255 may be disposed in a position that corresponds to the elastic member 250. In other words, the piston member 255 and elastic member 250 may be positioned on the same axis, i.e., at the same radius about the fixes shaft 100. Also, there may be two of the elastic members 250, one adjacent each of the brake shoes 260 in this embodiment.

When a rider operates a brake handle (not shown), hydraulic pressure is transferred through the brake cable 210, whereby the piston member 255 pushes the brake shoe 260s outwardly away from one another in a length or axial direction.

The brake pads 120, which are fixed to the external or outward facing sides and near the external periphery of the brake shoes 260, come in contact with the respective brake discs 215. Frictional force is thereby generated between the brake pads and the brake discs.

The bearings 110 are interposed between the interior circumference of the hub body 115 and the exterior circumference of the fixed shaft 100. The QR element or rod 200 is inserted and disposed along a center axis of the fixed shaft 100 in the length or axial direction.

When the QR lever 205 is locked, the fixed shaft 100 is fixed to a drop-out of a frame through the QR element or rod 200. The hub body 115 can be rotatable on and relative to the fixed shaft 100 through the bearings 110.

An exterior circumference of the hub body 115 is connected with a rim (not shown) through a spoke (not shown), and a tire is mounted on the rim. Herein, structures of the hub body 115, the spoke, the rim, and the tire are well known to those having ordinary skill in the art, and thus a detailed description will be omitted.

Figure 3:
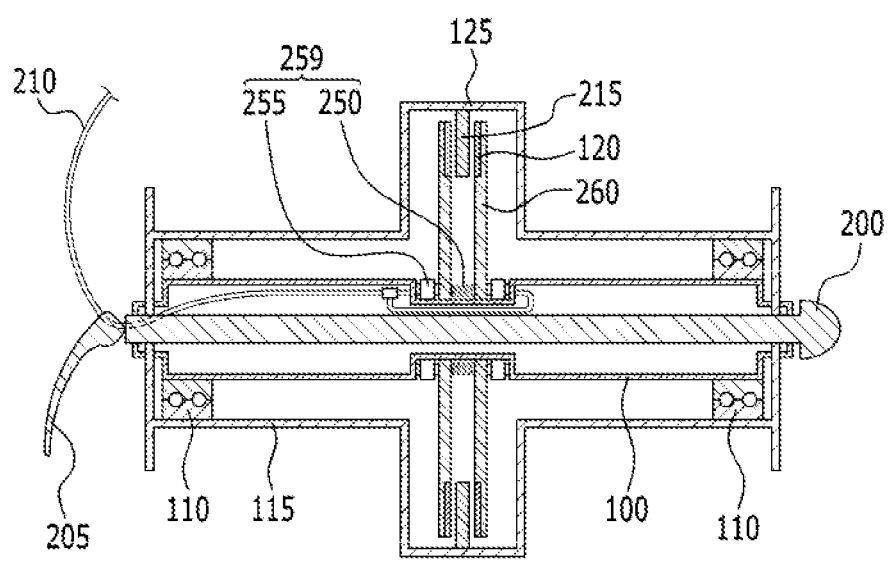
FIG. 3 is a schematic cross-sectional view of a hub unit having a brake disc according to another embodiment of the present disclosure.

FIG. 3 is a schematic cross-sectional view of a hub unit having a brake disc according to another embodiment of the present disclosure.

Referring to FIG. 3, the hub unit includes a brake cable 210, a QR lever 205, a first bearing 110, a hub body 115, a fixed shaft 100, a QR element or rod 200, a brake shoe 260, a brake pad 120, a brake disc 215, a body expansion portion 125, piston members 255, a second bearing 110, and an elastic member 250.

The brake shoe 260 in this embodiment is again formed as a pair of the brake shoes, each having a disc shape, and each facing the other. The fixed shaft 100 is disposed to penetrate a center portion of the brake shoes 260. The brake shoes 260 are fixed to the fixed shaft 100 in a rotation direction and are movable therealong in an axial direction.

The elastic member 250 is interposed between the brake shoes 260. The elastic member 250 supplies elastic force in an axial direction in which the brake pad 120 is separated from the brake disc 215. In this embodiment, the elastic member 250 pushes the brake shoes axially outward away from each other.

The piston members 255 push the brake shoes 260 toward one another to a center portion of the fixed shaft 100 in an axial direction. The elastic member 250 and the piston members 255 may again be disposed along the same axis corresponding to one another.

The body expansion portion 125, in which an exterior diameter of the hub body 115 is expanded in a radial direction, is formed at a center portion of the hub body 115 in a length or axial direction thereof. The brake disc 215 is disposed between the pair of brake shoes 260 in an internal space of the body expansion portion 125. An end or periphery portion of the brake disc 215 is fixed to an interior circumferential surface of the body expansion portion 125.

Accordingly, the hub body 115, the body expansion portion 125, and the brake disc 215 are rotatable together along with a rim and wheel. The brake pads 120 are mounted on an inner or inward facing side of the corresponding brake shoes 260 and face the brake disc 215.

The piston member 255 is disposed in a space formed in a center portion of the fixed shaft 100 in a length or axial direction thereof. An interior circumference of each of the brake shoes 260 is slidably disposed in a groove, which may be the space, formed in the fixed shaft 100.

When a rider operates a brake handle, hydraulic pressure is transferred through the brake cable 210, and the piston members 255 push the brake shoes 260 inwardly toward brake disc 215 in a length or axial direction.

The brake pads 120, which are fixed neat the external or radial periphery and to the internal or inward facing sides of the brake shoes 260, come in contact with the brake disc 215. Frictional force is thereby generated between the brake pads and the brake disc.

As described above, according to an embodiment of the present disclosure, the brake disc 215 is, or the brake discs 215, are disposed within in the hub body 115 and disposed at a center portion of the fixed shaft 100 in a length or axial direction. Thus, it is possible to prevent the brake disc or discs from being bent because the brake disc or discs are not exposed. Further, because the brake disc or discs are not exposed, the brake disc or discs are prevented from causing injury to a person. Further, instability of steering can be prevented by removing moment generated in one direction during braking because the brake disc or discs are center-mounted within the hub unit.

While this disclosure has been described in connection with what is presently considered to be practical embodiments, it is to be understood that the disclosure is not limited to the disclosed embodiments. On the contrary, this disclosure s intended to cover various modifications and equivalent arrangements included within the spirit and scope of the appended claims.

What is claimed is:

1. A hub unit having two brake discs, the hub unit comprising:
    a hub body, wherein an internal space is formed in the hub body and the two brake discs are fixed in the internal space;
    a fixed shaft disposed and fixed along a rotation center shaft of the hub body;
    a pair of brake shoes that face each other and that are coupled to the fixed shaft, wherein two brake pads are carried on the pair of brake shoes and come in contact with the two brake discs; and
    a braking force applier for supplying a braking force to the pair of brake shoes, wherein the two brake pads and the two brake discs are in contact with each other,
    wherein the braking force applier includes i) a piston member disposed to push the pair of brake shoes such that the two brake pads contact the two brake discs, and ii) an elastic member disposed to supply elastic force in a direction in which the two brake pads are separated from the two brake discs,
    wherein each of the two brake pads is disposed at an external side of a respective one of the two brake shoes,
    wherein each of the two brake discs is disposed at an inner side of the hub body corresponding to a respective one of the two brake pads,
    wherein the elastic member is disposed in or on the fixed shaft and supplies the elastic force to an external side of the pair of brake shoes to push the pair of brake shoes toward each other, and
    wherein the piston member is disposed between the pair of brake shoes and pushes the pair of brake shoes away from each other.

2. The hub unit of claim 1, wherein
    the two brake pads are fixed in surfaces of the pair of brake shoes that face each other, and
    the two brake discs are fixed to an interior circumference of the hub body with a predetermined gap between the two brake discs and the two brake pads.

3. The hub unit of claim 2, wherein
the two brake discs are disposed between the pair of brake shoes.

4. The hub unit of claim 2, wherein
the elastic member is disposed between the pair of brake shoes and pushes the pair of brake shoes away from each other.

5. The hub unit of claim 2, wherein
the piston member is disposed at an exterior side of the pair of brake shoes, respectively, and pushes the pair of brake shoes toward each other.

6. The hub unit of claim 1, wherein
the fixed shaft is disposed to penetrate a center portion of the pair of brake shoes, and the two brake pads are disposed respectively, in the pair of brake shoes.

7. The hub unit of claim 6, wherein
the fixed shaft is engaged with the center portion of the pair of brake shoes to fix the pair of brake shoes to the fixed shaft.

8. The hub unit of claim 1, wherein
the hub body is rotatably disposed relative to the fixed shaft through a bearing.

9. The hub unit of claim 1, wherein
the two brake discs are fixed to an inner side of the hub body and are disposed to face the two brake pads with a predetermined gap therebetween.

10. The hub unit of claim 1, wherein
a body expansion portion is formed as a part of the hub body such that an exterior diameter of the body expansion portion is expanded in a radial direction, and
the two brake discs are fixed to an inner side of the body expansion portion.

11. The hub unit of claim 1, further comprising:
a brake cable for supplying hydraulic pressure to the piston member.

* * * * *